United States Patent [19]

McGeary

[11] Patent Number: 4,723,071
[45] Date of Patent: Feb. 2, 1988

[54] ANTICOUNTERFEIT CARD-SENSING MECHANISM

[75] Inventor: Thomas C. McGeary, Palos Verdes Estates, Calif.

[73] Assignee: Light Signatures, Inc., Los Angeles, Calif.

[21] Appl. No.: 731,826

[22] Filed: May 8, 1985

[51] Int. Cl.$^4$ ............................................. G06K 7/08
[52] U.S. Cl. .................................. 235/449; 235/436; 235/454; 235/493
[58] Field of Search ............... 235/449, 382, 436, 454, 235/493; 360/2

[56] References Cited

U.S. PATENT DOCUMENTS

| | | | |
|---|---|---|---|
| 4,304,992 | 12/1981 | Kobayashi | 235/449 |
| 4,423,415 | 12/1983 | Goldman | 235/382 |
| 4,476,507 | 10/1984 | Koike | 360/2 |
| 4,574,190 | 3/1986 | Nishimura | 235/449 |
| 4,585,929 | 4/1986 | Brown | 235/449 |
| 4,591,937 | 5/1986 | Nakarai | 360/2 |

*Primary Examiner*—Harold I. Pitts
*Attorney, Agent, or Firm*—Nilsson, Robbins, Dalgarn, Berliner, Carson & Wurst

[57] ABSTRACT

A transducer apparatus for use with cards bearing a magnetic recording stripe and having an optically sensible anticounterfeit uniqueness characteristic, the apparatus including a sensor for the anticounterfeit characteristic which scans the card by a small discrete window of perception, pixel. The apparatus isolates predetermined areas of perception for the card, so as to verify on the basis of signals from a prior observation recorded by the magnetic stripe. Areas of perception, pixel size, are less than one sixty-fourth of a square inch. The magnetic sensing head of the apparatus is mounted with the anticounterfeit sensor to accommodate common resilient displacement with movement relative to a card.

8 Claims, 3 Drawing Figures

ANTICOUNTERFEIT CARD-SENSING MECHANISM

BACKGROUND AND SUMMARY OF THE INVENTION

In recent years, various technologies have been implemented in a variety of anticounterfeit devices and processing systems. For example, one such device is embodied as a card to identify an assigned holder and is used to support financial transactions. Such cards may be processed and verified by a sensing system. Of course, in addition to financial applications, a host of other applications exist for such cards. With respect to the present invention, the significant consideration is that such cards (embodied as various devices) possess an anticounterfeit uniqueness characteristic which can be repeatedly sensed to verify the authenticity of the card.

Several different uniqueness characteristics have been employed in cards to verify authenticity. For example, magnetic materials have been incorporated in fibers of a card (see U. S. Pat. No. 4,218,674 Brosow et al.), radiation reflectors have been incorporated in cards (see U.S. Pat. No. 4,359,633 Bianco), and the inherent fibers of card material have been employed as a technique for identifying stock materials (see U.S. Pat. No. 4,423,415 Goldman).

Generally, in sensing the uniqueness characteristic of a card for verification, it is important that the card be repeatedly sensed at the same locations. That is, if a characteristic at specific locations of a card is to identify the card as authentic, it is important that the card be consistently observed at substantially the same locations. In that regard, various techniques have been proposed for locating predetermined areas of a card to perform consistent observations. Such defined areas of observation might be termed areas of perception, windows, fields or pixels.

The present invention is based on recognizing the importance of utilizing small areas of perception in the verification of anticounterfeit cards. That is, the present invention is based on recognizing that the predetermined discrete areas of observation on the card should be quite small to effectively avoid the ease of counterfeiting. Specifically, it has been determined that areas of observation should not exceed one sixty-forth square inch. Such relatively small areas of observation considerably increase the difficulty of successfully counterfeiting cards. However, other problems are introduced.

It has been previously proposed in relation to anticounterfeit cards, to locate predetermined areas of observation by indexing the card with signals recorded on a magnetic stripe. Such a technique is disclosed in the above-referenced patents to Goldman and Brosow. While such systems may be effective, a substantial difficulty is encountered in attempting to employ such techniques in systems defining small areas of perception. In general, the system of the present invention includes apparatus for sensing a magnetic stripe to index an anticounterfeit card so as to effectively locate predetermined areas of perception. Such observations from small areas of perception provide signals for comparison with a reference to verify the authenticity of a specific card. Note that the reference signals may also be stored by the magnetic stripe of the card.

DESCRIPTION OF THE ILLUSTRATIVE EMBODIMENT

As indicated above, a detailed illustrative embodiment of the present invention is disclosed herein. However, specific sensors, data formats, identification media characteristic, and operating systems structured in accordance with the present invention may be embodied in a wide variety of different forms, some of which may be quite distinct from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
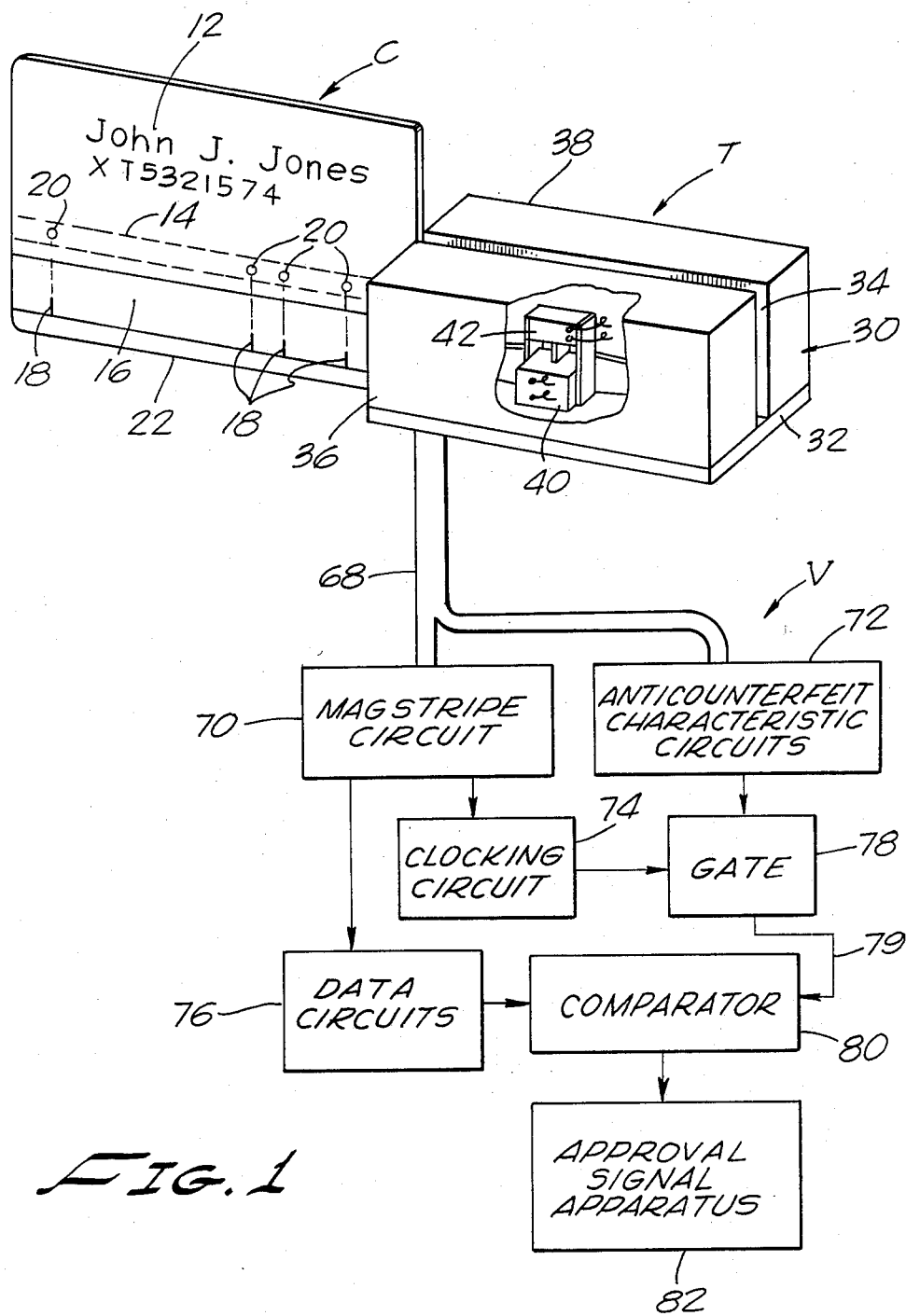
FIG. 1 is a perspective and block diagram of a system constructed in accordance with the present invention.

Referring initially to FIG. 1, an anticounterfeit card C is represented which may be repeatedly sensed for verification to establish it as authentic. As illustrated, the card C is positioned for passage through a transducer apparatus T. As the card C passes through the transducer apparatus T, data is sensed from the card in the form of electrical signals which are supplied to an electronic verification apparatus generally indicated as V, which manifests the authenticity of a valid card C.

The card C may be formed of a wide variety of different materials to afford a uniqueness characteristic. In the disclosed embodiment, the card C simply comprises organic fiber, e.g. paper of card thickness.

As illustrated, the card C is printed with indicia 12 which may specify the name of the assigned holder along with an identification number for the person. Below the indicia 12, an anticounterfeit stripe 14 is defined on the card. As indicated above, the stripe 14 may incorporate various characteristics capable of being machine sensed to identify the card C. In a sense, the stripe 14 embodies a "fingerprint" for the card C. In the disclosed embodiment, the stripe 14 is simply the fiber material of the card, the translucency of which affords the anticounterfeit characteristic as disclosed in detail in the above-referenced Goldman patent.

Below the anticounterfeit stripe 14 on the card C, a magnetic stripe 16 is provided for recording signals for use in verifying the card. Of course, various techniques are well known for recording data on magnetic stripe cards to provide data and synchronizing signals. Essentially, the techniques employed in accordance herewith involve recording signals on the magnetic stripe 16 which may be sensed to locate predetermined areas of the anticounterfeiting stripe 14. In the disclosed embodiments, the stripe also records the card characteristic data for verification.

The recording format may vary widely for cards of different systems. Furthermore, data and critical pixel locations may vary from card to card within a specific system. For purposes of illustration, assume that the marks 18 designated on the magnetic stripe 16 specify the location of pixel areas 20 on the anticounterfeit stripe 14. Generally, neither the marks 18 nor the areas 20 would be humanly perceivable; however, the illustration is simply for purposes of explanation.

In sensing the card C for verification, it is important that the pixel areas 20 on the anticounterfeit stripe 14 be accurately located with each repeated sensing. The vertical displacement of the areas 20 may be repeatedly located by reference to the bottom edge 22 of the card C. In accordance herewith, the horizontal location of the areas 20 is specified by signals representative (marks 18) sensed from the magnetic stripe 16. Generally, the present invention involves apparatus for effectively sensing the magnetic stripe 16 and consistently locating the relatively small areas 20 on the anticounterfeiting stripe 14. The electromechanical component of the system is contained in the transducer apparatus T.

The transducer apparatus T is embodied as a somewhat parallelelpiped frame configuration defining a slot in a housing 30. Specifically, the housing 30 is mounted on a base plate 32 and defines an open regular slot 34 for passing the card C. Accordingly, the housing 30 consists of two separate blocks 36 and 38 mounted on the base plate 32 in aligned, uniformly spaced-apart relationship.

The housing block 38 provides a guide for one side of the card C and additionally incorporates a lamp (not shown) for illuminating the opposed side of the card C as it passes through the slot 34. Thus, as the card C is moved, it is scanned by a light beam.

The housing block 36 (forward) contains the sensory structure including a magnetic head apparatus 40 for scan sensing the magnetic stripe 16, and a light sensor 42 for scan sensing the translucency or opacity of the anticounterfeit stripe 14. Note that the light sensor 42 defines the pixel size.

As disclosed in detail below, the head apparatus 40 and the sensor 42 are mounted for common flexible displacement with respect to the rigid frame including the block 36 and similarly with regard to the card C as it moves through the passage 34. The head apparatus 40 and the sensor 42 are mounted on a rectangular plate 44 (FIGS. 2 and 3) which is integral with a pair of oppositely-extending leaf-spring arms 46 and 48. Specifically, the leaf-spring arms 46 and 48 generally extend in coplanar parallel relationship with the plane of the slot 34 (FIG. 1) as does the integral plate 44.

The arms 46 and 48 may comprise a flexible sheet of copper alloy to afford leaf-spring resiliency. The ends of the arms 46 and 48 define openings 50 and 52 (FIG. 3) which receive tapered transverse retainer pins 54 and 56 respectively. It is important to recognize that the openings 50 and 52 are substantially larger than the pins 54 and 56 at the quiescent position of the arms 46 and 48. Accordingly, the arms 46 and 48 support the head apparatus 40 and the sensor 42 affording displacement in a direction perpendicular to the passage 34, and parallel to the passage 34 in the direction the card C moves through the passage 34. Accordinngly, the transducers can move more perpendicular to the card C, and along the motion direction of the card.

Figure 2:
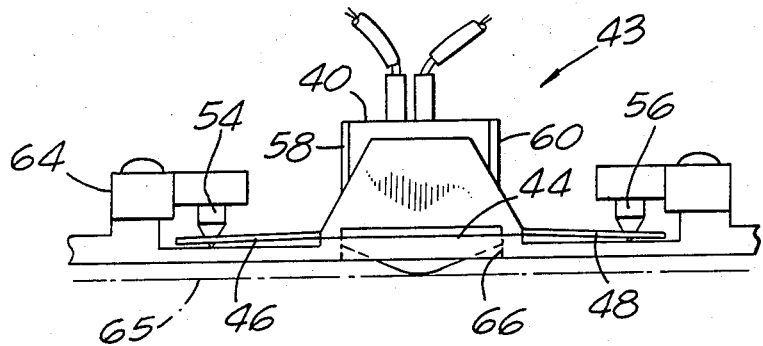
FIG. 2 is an exposed top view of a component in the system of FIG. 1.
Figure 3:
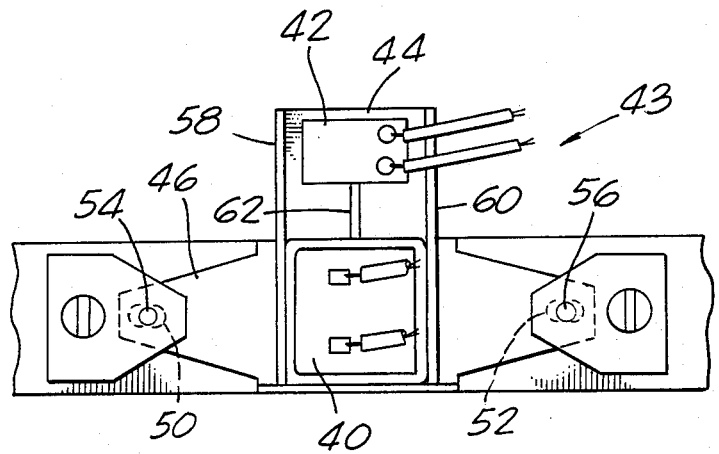
FIG. 3 is a side view of the structure of FIG. 2.

Structurally, the head apparatus 40 and sensor 42 are affixed in the holder 43 as by soldering or other fastening techniques. In the proximity of the plate 44, the holder 43 is provided with dimensional rigidity by a pair of side braces 58 and 60 (FIG. 2 and 3). Additionally, a central brace 62 extends perpendicular to the plate 44 between the head apparatus 40 and the sensor 42.

The tapered pins 54 and 56 (FIG. 2) are rigidly fixed in a frame bracket 64 which is in turn rigidly fixed within the block 36 at the support plate 32. The base 65 of the frame bracket 64 defines an aperture 66 which receives a portion of the head apparratus 40 so as to enable direct sliding contact between the head apparatus 40 and a passing card C. Of course, the aperture also provides a clear path to the light sensor 42 across the slot 34 for sensing the translucency of the card along the anticounterfeiting stripe 14. Thus, as a card C (FIG. 1) passes through the slot 34, the magnetic head apparatus 40 scans the magnetic stripe 16 while the sensor 42 scans the anticounterfeit stripe 14. Scanned signals representative of the card C are supplied to the verification apparatus V.

An electrical cable 68 (FIG. 1) from the transducer apparatus T supplies signals to a magnetic stripe circuit 70 and an anticounterfeit characteristic circuit 72. The magnetic stripe circuit 70 derives clock signals from the observed data as generally well known in the prior art along with data signals indicative of both the locations and characteristic of the pixel areas 20 on the card C. Note that while the uniqueness characteristic stripe 14 is sensed by scanning as a continuous signal, samples are selected that manifest the areas 20. Specifically, the areas 20 are selected by a counting clock circuit 74 to gate samples of the continuous signals that are representative of the translucency values at locations 20. Such values are compared with recorded values developed from the magnetic stripe 16 in data circuits 76. Somewhat more detailed structures as for use in the system are disclosed in the above-referenced Goldman patent.

The continuous signal from the anticounterfeit characteristic circuit 72, representative of the translucency of the stripe 14, is supplied to a gate 78 which selectively passes signal representations indicative of the predetermined areas 20. Thus, the gate 78 passes select signal values to a connector 79 which provides digital signals representative of the opacity of the anticounterfeit stripe 14 at the predetermined areas 20. Such signals are supplied to a comparator 80 along with signals from the data circuits 76 constituting prerecorded values from prior similar observations.

If current observation data substantially matches the previously observed data, the comparator 80 actuates an approval-signal apparatus 82 which manifests the active card C as genuine. Of course, the approval signal apparatus 82 may comprise any of a variety of audio or visual devices to signal card authenticity.

It is important to recognize that the magnetic head apparatus 40 rides on the magnetic stripe 16 and that the mounting structure incorporating the leaf-spring arm 46 and 48 allow the head apparatus 40 and the sensor 42 a degree of motion freedom. The ability of a magnetic head to effectively ride on the magnetic stripe 16 has been previously recognized as an important aspect of magnetic transducers. In accordance herewith, the flexibility afforded the head apparatus 40 is also afforded the sensor 42 which has been determined to be critically important in applications utilizing areas of perceptin 20 of relatively small size.

Considering the detailed operation of the system, reference will now be made somewhat concurrently to the figures while pursuing select illustrative operations for purposes of explanation. Preliminarily, assume the presence of a card C poised at the entry of the slot 34 substantially as depicted in FIG. 1. In accordance with the disclosed embodiment, the card C is manually moved through the slot 34 to accommodate dynamic magnetic transducing. Such techniques are well known in the prior art and accommodate a degree of variation in the speed of the card moving across the transducer.

As the card C moves through the passage 34, the magnetic head apparatus 40 rides on the magnetic stripe 16. Concurrently, the sensor 42 scans the anticounterfeit stripe 14 providing a continuous translucency scan signal. As indicated above, the pixel, or area of perception of the sensor 42 is relatively small somewhat as represented by the individual sample areas 20 designated on the card C.

It is important to appreciate that as the magnetic head apparatus 40 rides on the stripe 16, it is variously displaced with respect to both the frame (incorporating base plate 32) and the card C. However, as determined to be important in accordance herewith, the sensor 42 experiences concurrent displacement. As a result, signals sensed by the magnetic head apparatus 40 are effectively co-related in time with signals sensed by the anticounterfeiting sensor 42. Thus, space displacements of the sensors are maintained similar to present timing relationships within the signals produced.

The anticounterfeiting sensor 42 provides a continuous analog signal to the circuit 72, representative of a translucency scan along the stripe 14. Concurrently, the magnetic stripe 16 is sensed by the head apparatus 40 which may perceive a plurality of tracks to provide several distinct data. Specifically, the magnetic track provides data representative of both the position and characteristic of the areas 20. Additionally, the magnetic stripe 16 may provide related information as that manifest by the indicia 12 on the card C. Of course, depending upon specific applications and implementations, wide variations may occur in specific magnetic recording formats.

The analog signal representative of the translucency scan (track 14) is applied to the anticounterfeit characteristic circuit 72 for processing preliminary to sampling. Concurrently, the magnetic stripe circuit 70 processes the data from the magnetic stripe to provide signals at the counting clock circuit 74 manifesting both the sample times and the translucency values as previously observed.

At the predetermined instant of sampling (clock related) the circuit 74 actuates the gate 78 to pass sample signals representative of the areas 20. The gated signals are translated to a digital format by the connector 79 then provided to the comparator 80. To accomplish the comparison, the comparator also receives signals representative of the same areas 20 as sensed during a previous observation.

The signal sets (representative of a prior sensing and a current sensing) are compared by the comparator 80 seeking a degree of similarity. If the requisite degree of similarity exists, the comparator 80 provides an approval signal to the approval signal apparatus 82 which manifests the authenticity of the card C. Thus, reliable indications are provided for testing the authenticity of a card C based on its uniqueness characteristic.

In practicing the present invention, various possibilities exist with regard to sensing the anticounterfeit characteristic. In the disclosed embodiment, the sensing was described as observations of translucency at the areas 20 (FIG. 1) that are less than one sixty-fourth square inch. The important consideration is that the anticounterfeit characteristic sensor is rigidly linked to the magnetic sensor. As a consequence, if the magnetic sensor is slightly displaced from a residual position, so also will be the anticounterfeit sensing apparatus. As indicated above, thta apparatus can take a variety of forms. Thus, an effective, reliable system is provided in which the difficulty of counterfeiting cards C is increased by the relatively small size of the areas of perception 20. Yet, the system in accordance with the present invention affords accurate perception of the areas for reliable operation.

As will be readily appreciated from the above illustrative embodiment, the system hereof is susceptible to a great number of modifications and deviations within the basic conceptual framework. Accordingly, the scope hereof is appropriately deemed to be as set forth in the claims below.

What is claimed is:

1. A transducer apparatus for use with cards or the like to concurrently sense magnetic data and displaced yet space-related anticounterfeit characteristic data from a card, said anticounterfeit characteristic data being sensed by radiant energy from said card, said transducer apparatus comprising:

a frame member defining a slot passage for receiving a moving card;

a magnetic head assembly for sensing said magnetic data;

an anticounterfeit characteristic radiant energy sensor for sensing said anticounterfeit characteristic data which is displaced from said magnetic data on said card; and a flexible support for said magnetic head assembly and said anticounterfeit characteristic radiant energy sensor for supporting said magnetic head assembly and said anticounterfeit radiant energy sensor in spaced-apart relationship with respect to said card whereby said magnetic head assembly senses said magnetic data and said radiant energy sensor senses said displaced anticounterfeit characteristic data, said support being affixed to said frame member whereby said magnetic head and said characteristic radiant energy sensor are rigidly joined for limited common displacement in contiguous relationship to said passage whereby to sense co-related radiant energy and magnetic signals from said card while moving to accommodate the displacement of said card through said slot passage.

2. An apparatus according to claim 1 wherein said flexible support comprises a leaf-spring means.

3. An apparatus according to claim 1 wherein said flexible support comprises a rigid mount for said head assembly and said sensor, and a pair of leafspring means affixed to said mount and a pair of tapered pins anchoring said spring means.

4. An apparatus according to claim 1 wherein said flexible support comprises means accommodating common displacement of said head assembly and said sensor substantially perpendicular to the plane of said slot.

5. An apparatus according to claim 1 wherein said flexible support comprises means accommodating common displacement of said head assembly and said sensor in the directions of card movement through said slot.

6. An apparatus according to claim 1 further including means for processing signals sensed by said magnetic head assembly to sample signals sensed by said characteristic sensor.

7. An apparatus according to claim 6 further including means for testing said sample signals for comparison with reference values.

8. An apparatus according to claim 1 wherein said anticounterfeit characteristic sensor senses a pixel of less than one sixty-fourth of one square inch.

* * * * *